(12) United States Patent
Hunter et al.

(10) Patent No.: US 7,389,154 B2
(45) Date of Patent: Jun. 17, 2008

(54) FABRICATING A THREE-DIMENSIONAL OBJECT

(75) Inventors: Shawn D Hunter, Corvallis, OR (US); Vladek P Kasperchik, Corvallis, OR (US); Jeffrey Allen Nielsen, Corvallis, OR (US); David C Collins, Philomath, OR (US); Tony Cruz-Uribe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 10/976,574

(22) Filed: Oct. 29, 2004

(65) Prior Publication Data

US 2006/0071367 A1 Apr. 6, 2006

Related U.S. Application Data

(60) Provisional application No. 60/614,512, filed on Sep. 29, 2004.

(51) Int. Cl.
| | |
|---|---|
| *G06F 19/00* | (2006.01) |
| *B29C 65/00* | (2006.01) |
| *B32B 37/00* | (2006.01) |
| *B28B 3/10* | (2006.01) |
| *B32B 38/00* | (2006.01) |

(52) U.S. Cl. ............... 700/119; 700/118; 264/308; 156/284

(58) Field of Classification Search ............... 700/98, 700/117, 118, 163, 119; 264/308; 156/284
See application file for complete search history.

(56) References Cited

U.S. PATENT DOCUMENTS

| 4,470,953 | A | * | 9/1984 | Bruce ............................ 419/6 |
|---|---|---|---|---|
| 5,561,827 | A | * | 10/1996 | Reeves et al. ................. 419/5 |
| 5,747,561 | A | * | 5/1998 | Smirnov et al. ............ 523/212 |
| 5,869,170 | A | * | 2/1999 | Cima et al. ............. 428/304.4 |
| 5,932,055 | A | * | 8/1999 | Newell et al. .............. 156/245 |
| 6,048,487 | A | * | 4/2000 | Almquist et al. ........... 264/401 |
| 6,514,518 | B2 | * | 2/2003 | Monkhouse et al. ........ 424/427 |
| 2002/0020945 | A1 | * | 2/2002 | Cho et al. ................... 264/460 |
| 2004/0182510 | A1 | * | 9/2004 | Pfeifer et al. ............... 156/284 |
| 2005/0074596 | A1 | * | 4/2005 | Nielsen et al. ........... 428/304.4 |
| 2005/0130397 | A1 | * | 6/2005 | Bentley et al. ............. 438/584 |

OTHER PUBLICATIONS

"Wetting" definition printed from Wikipedia, Oct. 2006.*

* cited by examiner

*Primary Examiner*—Michael D. Masinick

(57) ABSTRACT

A three-dimensional object is fabricated from powder. A powder layer is deposited. The powder layer is selectively wetted to hinder movement of the powder. A binder is applied to selected areas of the powder layer to harden the areas of the powder layer. The steps are repeated until the three-dimensional object is fabricated.

26 Claims, 5 Drawing Sheets

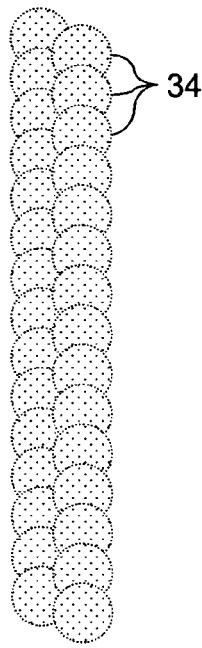
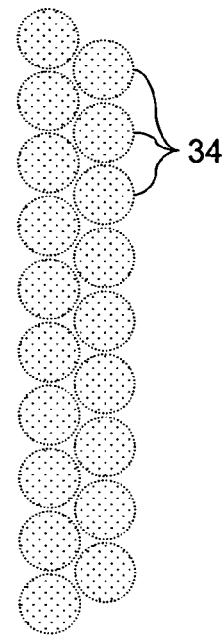
FIG. 9  FIG. 10
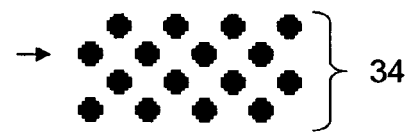
FIG. 13
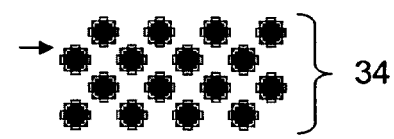
FIG. 14
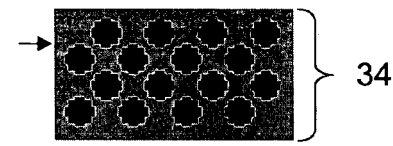
FIG. 15
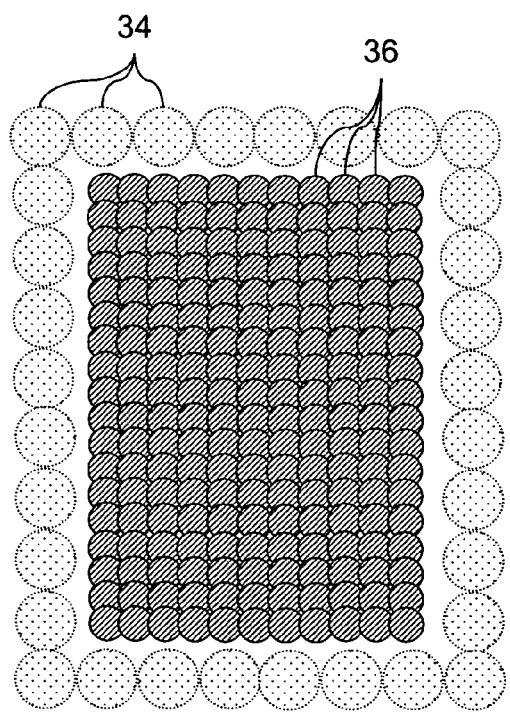
FIG. 11
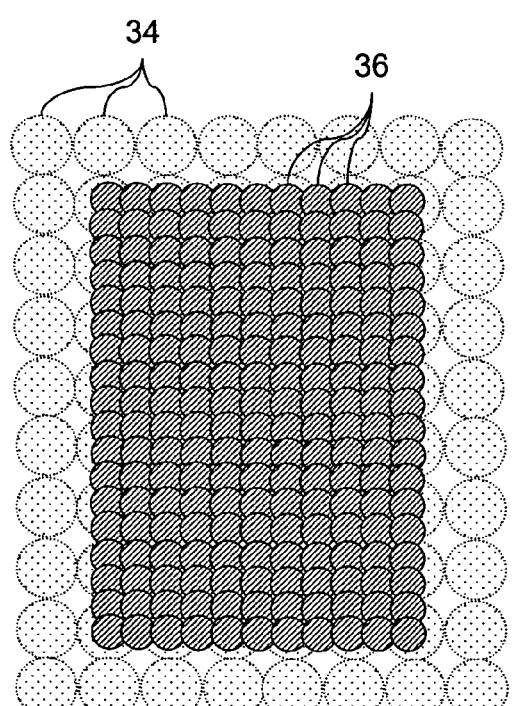
FIG. 12

FABRICATING A THREE-DIMENSIONAL OBJECT

CLAIM OF PRIORITY

This application claims the benefit of U.S. Provisional Application No. 60/614,512, filed on Sep. 29, 2004, entitled FABRICATING A THREE-DIMENSIONAL OBJECT, and having express mail label number EL871865041 US (Attorney Docket Number 200309780-1).

BACKGROUND OF THE INVENTION

One technique for fabricating three-dimensional objects is to deposit layers of dry powder and bind selected portions of the layers together. A common problem faced when creating three-dimensional objects from dry powder is that powder particles in the surface layer are easily displaced by activities required to apply binder to the powder.

One significant cause of the dry powder disturbance is kinetic energy of the binder drops hitting the surface layer at a speed usually in the range of 5-20 m/sec. On impact, binder drops create small "craters" on the non-bound powder surface. This "cratering" manifests itself in increased surface roughness of the printed object and, hence, degrades the object quality. In some extreme cases (low mass/density powder particles, heavy and fast drops) the "cratering" makes creation of a smooth surface finish very difficult to achieve.

Another common cause of powder disturbance is air turbulence related to fast motion of print members, such as printheads and carriages, in close proximity to the surface of the dry powder. Build powder easily moves or becomes airborne, resulting in increased print member contamination and in reduced object quality. When airborne powder settles and builds up on print members, their ability to accurately apply binder fluid is reduced or eliminated. Since accurate and consistent placement of binder fluid is required to provide structure and strength to the object being built, reduced print member performance may result in reduced object structure and strength. Additionally, for objects where color is applied, poor appearance may result from even a small number of blocked nozzles on one print member.

SUMMARY OF THE INVENTION

According to principles of the present invention, in one embodiment, a three-dimensional object is fabricated from powder. A powder layer is deposited. The powder layer is selectively wetted to hinder movement of the powder. A binder is applied to selected areas of the powder layer to harden the areas of the powder layer. The steps are repeated until the three-dimensional object is fabricated.

DESCRIPTION OF THE DRAWINGS

FIG. 9 illustrates one embodiment of a wetting agent pattern.

FIG. 10 illustrates another embodiment of a wetting agent pattern.

FIG. 11 shows one embodiment of the wetting pattern and binder pattern.

FIG. 12 shows another embodiment of the wetting pattern and binder pattern.

FIGS. 13-15 are illustrations showing an embodiment of the effect of the passage of time on applied wetting agent.

DETAILED DESCRIPTION OF THE INVENTION

Figure 1:
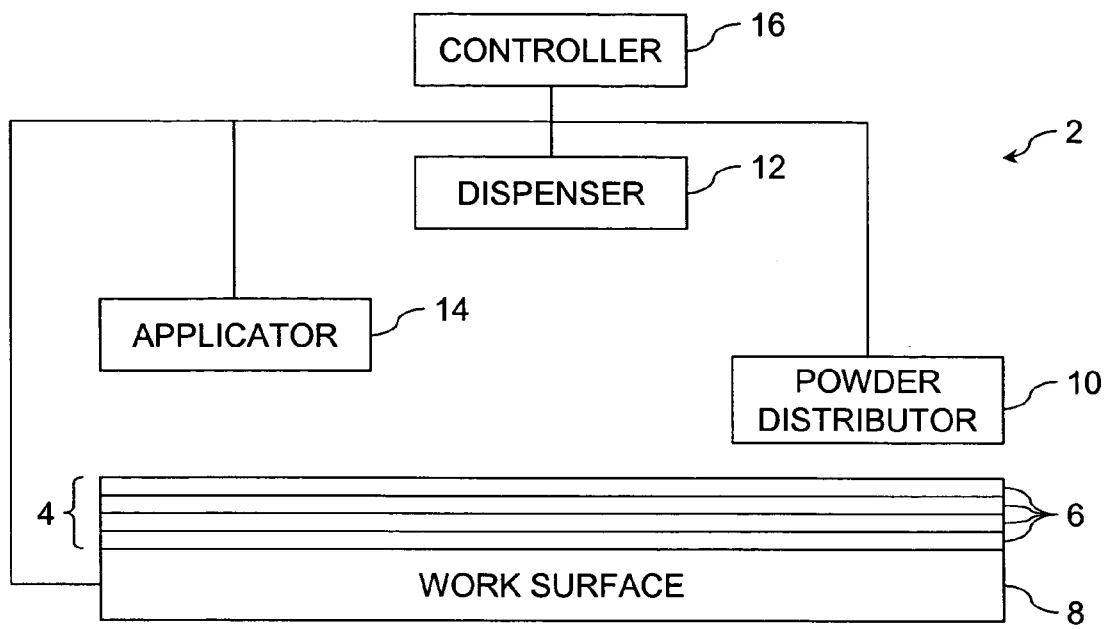
FIG. 1 is a block diagram illustrating one embodiment of the present invention solid freeform fabrication tool.

FIG. 1 shows one embodiment of solid freeform fabrication tool 2 for making a three-dimensional object 4 from powder layers 6. The height of each layer 6 is exaggerated to better illustrate the invention. In one embodiment, solid freeform fabrication tool 2 includes work surface 8, powder distributor 10, dispenser 12, and applicator 14. Controller 16 coordinates the operation of work surface 8, powder distributor 10, dispenser 12, and applicator 14.

Figure 3:
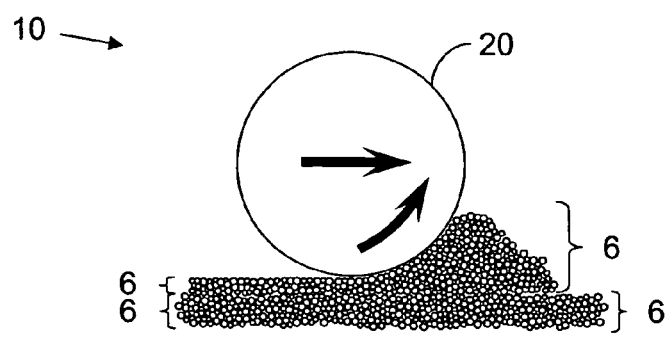
FIG. 3 is an illustration showing one embodiment of the rotating roller of the powder distributor shown in FIGS. 1 and 2.

Work surface 8 is any surface or platform upon which object 4 may be supported while being fabricated. Powder distributor 10 is any apparatus or system configured to deposit powder layers 6 onto work surface 8. In one embodiment, as shown in FIG. 3, powder distributor 10 includes a rotating roller 20 which spreads an amount of powder to a desired thickness as it moves above the build work surface.

Referring again to FIG. 1, in one embodiment, work surface 8 is moveable with respect to powder distributor 10 for precise deposit of powder layer 6 onto work surface 8. In an alternate embodiment, powder distributor 10 is moveable with respect to work surface 8. In either embodiment, the relative movement enables powder distributor to deposit powder layer 6 in the desired location relative to work surface 8.

Each powder layer 6 is formed by depositing loose powder particles onto work surface 8 or a previously deposited layer 6. As each successive layer 6 is deposited onto work surface 8, the three-dimensional shape of object 4 is progressively defined. Either work surface 8 lowers for each new layer 6 or powder distributor 10 rises for each new layer 6, such that the uppermost layer 6 is always at the proper distance from powder distributor 10.

Applicator 14 is any apparatus or system configured to apply binder to selected areas of powder layers 6. Binder is applied selectively to each powder layer 4. The binder bonds together those powder particles in the selected areas where the binder is applied. The powder particles in the areas where binder is not applied remain loose or separated from one another and are removed at some time during or after the build process. Often the powder particles are left in place until the completion of the build process to support other layers of powder. Another layer of powder is spread over the preceding one, and the process is repeated.

In one embodiment, dispenser 12 is a distance greater from work surface 8 than applicator 14 is from work surface 8. Alternatively, dispenser 12 may be either the same distance or a lesser distance from work surface 8 than applicator 14 is from work surface 8.

Figure 4:
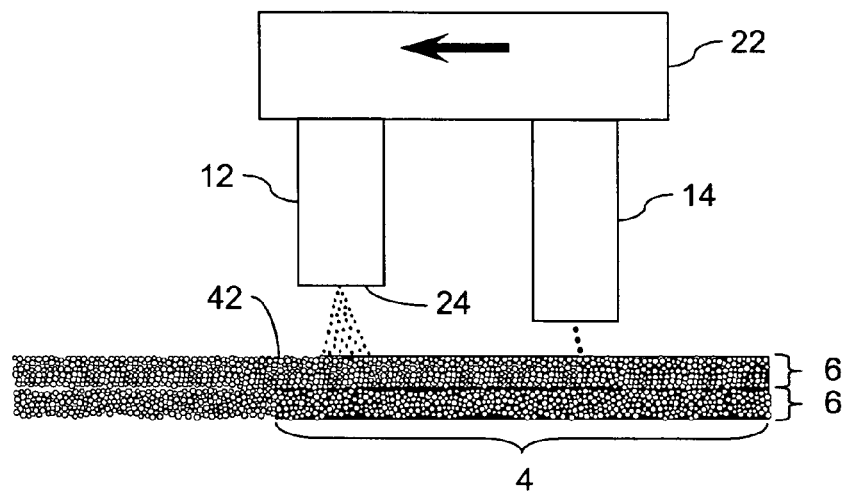
FIG. 4 is an illustration showing one embodiment of the dispenser and applicator shown in FIG. 1.

Dispenser 12 is any apparatus or system configured to dispense wetting agent onto the powder layers 6. FIG. 4 is an illustration showing one embodiment of dispenser 12 and applicator 14 carried by carriage 22. In this embodiment, dispenser 12 includes an aerosol spray head 24. In the illustrated embodiment, dispenser 12 is shown further from powder layers 6 than applicator 14. Alternatively, aerosol spray head 24 may be the same or a lesser distance from powder layers 6 than is applicator 14.

Figure 5:
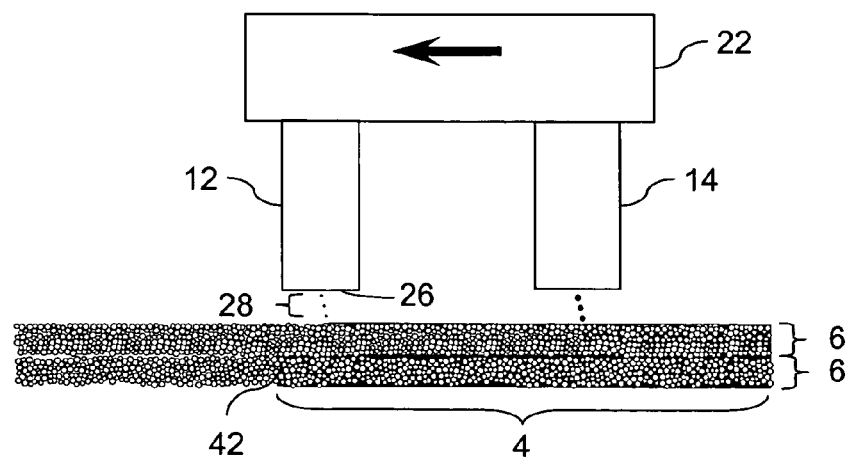
FIG. 5 is an illustration showing another embodiment of the dispenser and applicator shown in FIG. 1.

FIG. 5 is an illustration showing another embodiment of the dispenser and applicator carried by carriage 22. In this embodiment, dispenser 12 includes a printhead device 26 dispensing low-weight wetting agent drops 28. In this embodiment, dispenser 12 is shown the same distance from powder layers 6 as is applicator 14. Alternatively, aerosol spray head 24 may be a greater or lesser distance from powder layers 6 than is applicator 14.

Although dispenser 12 and applicator 14 are depicted in both FIGS. 4 and 5 as being carried by the same carriage 22, dispenser 12 and applicator 14 may alternatively be carried by separate carriages 22.

The wetting agent hinders movement of the powder particles in the powder layers 6, but does not react with the powder particles to bind them together permanently. In one embodiment, powder particles wetted with the wetting agent are loosely bound together by capillary forces and, hence their movement is hindered.

The wetting agent is applied to powder layers 6 prior to application of the binder. In one embodiment, the wetting agent is applied with less kinetic energy than the binder. The kinetic energy with which the wetting agent is applied depends on the mass and velocity of the wetting agent drops. Reducing the kinetic energy of the wetting agent is accomplished by reducing the mass, velocity, or both the mass and velocity of the wetting agent drops.

As the wetting agent is not used to bind the powder particles shaping the three-dimensional object 4, drop placement accuracy for the wetting agent is not generally as critical as it is for the binding process. Since drop placement accuracy is less critical for the wetting agent, it can be applied with much lower drop velocity in order to minimize surface disturbances caused by kinetic impact of the drop. For example wetting agent may be sprayed as a mist over powder layers 6. With the wetting agent applied, powder layer 6 is less likely to be disturbed during the application of the binder.

Additionally, since drop placement accuracy is not critical for the wetting agent, less expensive means of application, such as an aerosol head 24, may be employed to deposit the wetting agent. Furthermore, the spacing between wetting agent dispenser 12 and powder layers 6 can be large, to minimize powder disturbance during its application as well as to reduce contamination of wetting agent dispenser 12. In one embodiment, dispenser 12 is also horizontally far away from applicator 14. For example, dispenser 12 may be on a separate carriage 22 and a separate process from applicator 14. This allows, for example, dispenser 12 to be on a different swath or far away on same swath from applicator 14.

Binder applicator 14 may also be fixtured much closer to powder layers 6 than is wetting agent dispenser 12. Fixturing binder applicator 14 close to powder layers 6 provides improved binder placement accuracy.

In one embodiment, the wetting agent is different than the binder. In an alternate embodiment, the wetting agent is the same as the binder, but applied at a saturation level insufficient to permanently bond the powder particles together. By applying binder below this saturation level threshold, the powder is temporarily wetted and held in place so that subsequent printing at full saturation can be done without disturbing the powder through drop impacts or carriage aerodynamics. In this embodiment, the powder printed with a saturation below the threshold dries out such that unsaturated powder may be reusable. In one example of this embodiment, where the wetting agent and the binder are the same, the binder is applied as a wetting agent in an amount less than about 25% of default, fully bound, saturation. In another embodiment, a pattern, such as a checkerboard, may be applied to ensure that the macro-area saturation stays below the critical threshold.

Desirable qualities in the wetting agent include good wetting of the powder particles, non-reactivity of the wetting agent with the powder, and volatility. Volatility enables the wetting agent to be separated from the non-bound powder so that the non-bound powder may be reused. A volatile wetting agent may be driven off prior to application of the next powder layer 6 or at the end of the build process.

Selection of the pre-wetting fluid is determined by the nature of the powder used in the fabrication. For example, given a powder system that uses an aqueous binder fluid, a hydrophobic liquid may be desirable as the pre-wetting fluid. An example of this type of material is a silicone fluid. It is also desirable that the molecular weight be high enough to not be drawn immediately away from the exposed surface, but low enough to be ejectable from a low-cost application device such as a thermal inkjet printhead or aerosol sprayer. Examples of the appropriate silicone fluids include volatile methylsiloxanes from "Dow Corning" such as OS-10, OS-20, OS-30, or mixtures of them with dimethylcyclosiloxane and/or hexamethyldisiloxane (sold by "Dow Corning" as Dow Corning 245 and Dow Corning 246 fluids). The viscosity of the pre-wetting silicone fluids may be adjusted over a very wide range by mixing them with high viscosity silicone oils based on polydimethylsiloxane polymers and oligomers such as Dow Corning 200® Fluid 10,000 cs, Dow Corning200® Fluid 12,500 cs, Dow Corning200® Fluid 30,000 cs, and Dow Corning 200® Fluid 60,000 cs.

For the case of an aqueous binder, examples of the binder-miscible pre-wetting fluids include low molecular weight volatile alcohols such as methanol, ethanol, and isopropanol. These substances may be used for the pre-wetting of the powder in both pure form as well as mixed in different proportions with water.

If a pre-wetting fluid is chosen that reacts or interferes with the binder, then the pre-wetting fluid may be dispensed in ways to minimize the effects of this interference. One embodiment dispenses pre-wetting fluid only where binder is not being dispensed. Another embodiment biases the pre-wetting fluid pattern back from edges 42 (FIGS. 4-7) of the bound parts to ensure the smoothness of edges 42.

Figure 2:
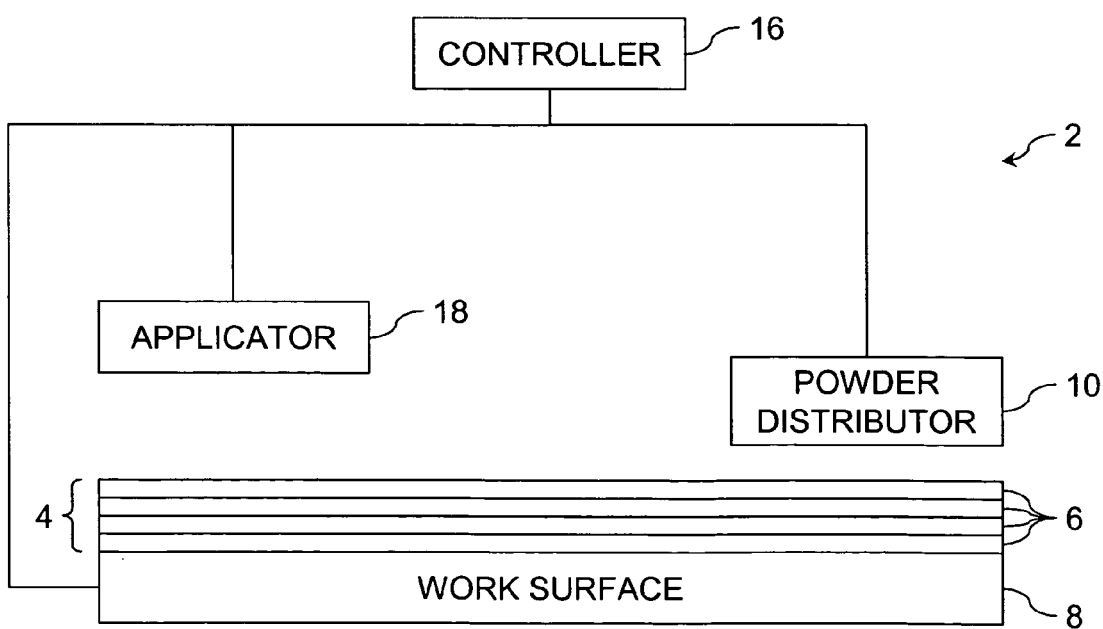
FIG. 2 is a block diagram illustrating another embodiment of the present invention solid freeform fabrication tool.

FIG. 2 shows another embodiment of solid freeform fabrication tool 2. In this embodiment, solid freeform fabrication tool 2 includes work surface 8, powder distributor 10, and applicator 18. Controller 16 coordinates the operation of work surface 8, powder distributor 10, and applicator 18.

Applicator 18 is any apparatus or system configured to sequentially dispense a wetting agent onto powder layers 6 and then to apply binder to selected areas of powder layers 6. In this embodiment, kinetic energy is reduced in the wetting agent by dispensing the wetting agent with a smaller drop size than the binder. In one embodiment, applicator 18 is capable of dispensing fluid drops of more than one size or weight or velocity. In one embodiment, applicator 18 includes an aerosol spray head. In an alternate embodiment, applicator 18 includes a printhead device. Additionally, in one embodiment, applicator 18 includes a printhead device having two different size nozzles to provide two different drop masses.

Figure 6:
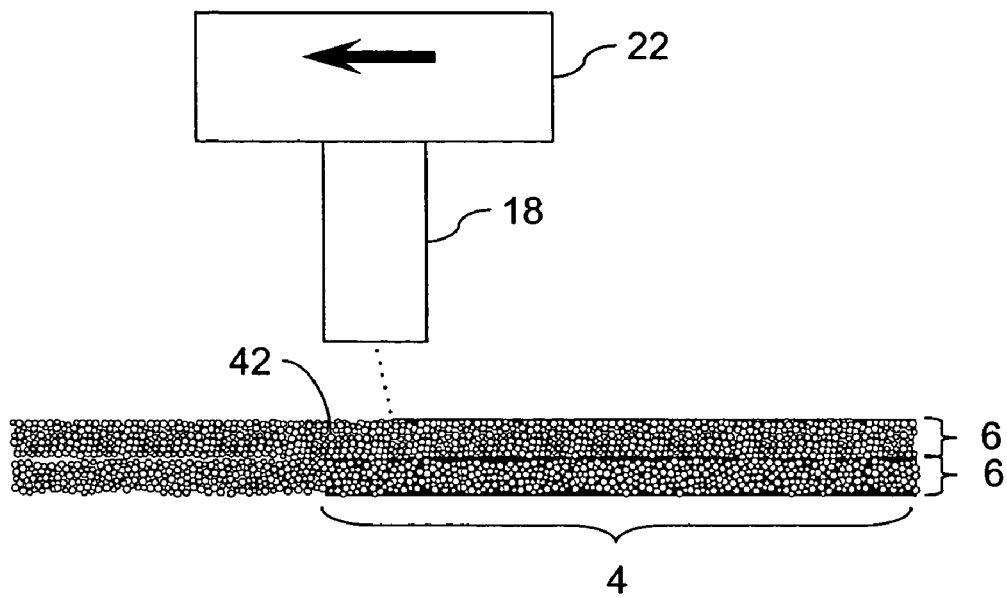
FIG. 6 is an illustration depicting the applicator, shown in FIG. 2, dispensing wetting agent.
Figure 7:
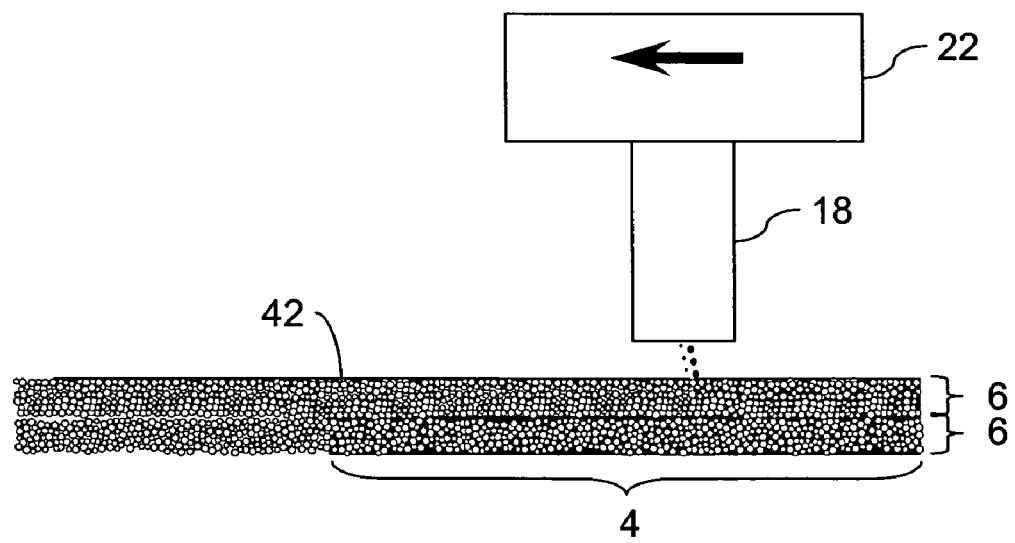
FIG. 7 is an illustration depicting the applicator, shown in FIG. 2, applying binder.

FIG. 6 shows applicator 18 dispensing wetting agent and FIG. 7 shows applicator 18 applying binder over the previously wetted powder layer 6. The wetting agent is applied with a small drop size or low velocity in order to reduce kinetic energy which may disturb powder layer 6. The binder is applied with either a larger drop size, a small drop size, or a combination of small and larger drop sizes.

Figure 8:
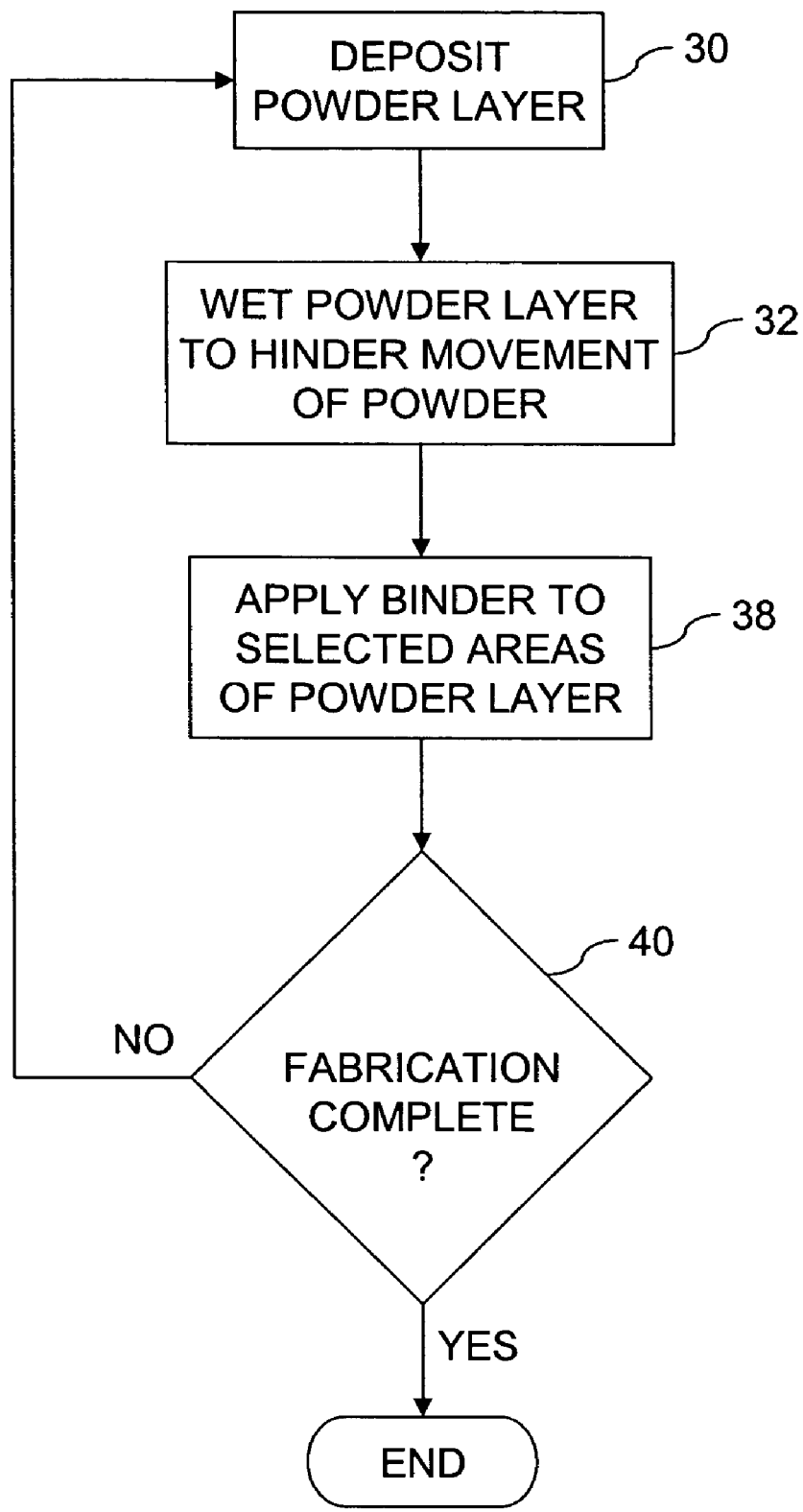
FIG. 8 is a flowchart illustrating one embodiment of the present invention method for fabricating a three-dimensional object.

FIG. 8 is a flow chart representing steps of one embodiment of the present invention method for fabricating a three-dimensional object. Although the steps represented in FIG. 8 are presented in a specific order, the present invention encompasses variations in the order of steps. Furthermore, additional steps may be executed between the steps illustrated in FIG. 8 without departing from the scope of the present invention.

Powder layer 6 is deposited 30. Powder layer 6 is wetted 32 to hinder movement of the powder. Powder layer 6 is wetted by applying the wetting agent. In one embodiment, drop placement of the wetting agent to wet the powder layer is not critical.

Referring again to FIG. 8, a binder is applied 38 to selected areas of powder layer 6 to harden the selected areas of powder layer 6. In one embodiment, powder layer 6 is wetted from a distance greater than the distance from which the binder is applied to powder layer 6. In alternative embodiments, powder layer 6 is wetted from a distance lesser than or equal to the distance from which the binder is applied to powder layer 6.

In one embodiment, only areas outside of object 4 are wetted 32. In another embodiment, only the powder layer 6 prior to the first layer 6 of object 4 is wetted. In an alternate embodiment, only the first powder layer 6 of object 4 is wetted.

Powder layer 6 is selectively wetted in any desirable pattern. For example, powder layer 6 may be entirely wetted, or wetted in a geometric pattern, such as a checkerboard pattern. The pattern may be at any scale, including a voxel level scale. A voxel is a volume element, the smallest distinguishable box-shaped part of a three-dimensional space. In another embodiment, powder layer 6 is wetted on all except edges 42 (FIGS. 4-7) of powder layer 6.

FIG. 9 illustrates one embodiment of a wetting agent pattern. In this embodiment, the wetting agent is applied with a drop 34 in every voxel. FIG. 10 illustrates another embodiment of a wetting agent pattern, wherein each drop 34 is spaced apart.

FIG. 11 shows one embodiment of the wetting pattern and binder pattern. In this embodiment, drops 34 of wetting agent surround binder drops 36, without contacting the binder drops 36.

FIG. 12 shows another embodiment of the wetting pattern and binder pattern. In this embodiment, drops 34 of wetting agent cover the entire powder layer and are at least partially covered by binder drops 36.

FIGS. 13-15 are illustrations showing an embodiment of the effect of the passage of time on applied wetting agent. FIG. 13 shows a pattern of wetting agent drops 34, as they are deposited on powder layer 6. In this embodiment, drops 34 begin to spread after they have been deposited. FIG. 14 shows the pattern of wetting agent drops as the wetting agent begins to spread. FIG. 15 shows the pattern of wetting agent drops 34 as it continues to spread.

In one embodiment, the wetting agent is applied with dispenser 12 and binder is applied with applicator 14, separate from dispenser 12. A small-drop printhead dispenser 12 can be mounted with a large distance to the powder so that the dry powder is not disturbed by the motion of dispenser 12 and so that the drop velocity is very slow when it impacts the powder. This small-drop printhead dispenser 12 can then be followed on by a nominal-drop printhead applicator 14 that is mounted with a small distance to the deposited powder to achieve good effective binder directionality. In one embodiment, dispenser 12 is mounted on a separate carriage 22, one swath, or more, ahead of applicator 14 to ensure that powder layer 6 is wetted prior to encountering turbulence associated with applicator 14, which is nearer to powder layer 6 than dispenser 12. This allows for bi-directional application of the wetting agent prior to the application of the binder. Since the wetting agent and the binder are applied with different printhead devices, this embodiment also provides flexibility in choosing the wetting agent and dispensing methods.

In an alternate embodiment, both the wetting agent and the binder are applied with applicator 18. An initial pass can be made over powder layer 6 with the printhead applicator 18 high above powder layer 6. During this pass, a small amount, an amount insufficient to permanently bond the powder particles together, of binder is applied to wet the surface of powder layer 6. This is followed by the binder application pass, which may be done with applicator 18 very near powder layers 6. Since the same agent is used for both binding and pre-wetting, this embodiment has the advantage that only one liquid need be supplied to solid freeform fabrication tool 2, therefore, reducing the complexity of solid freeform fabrication tool 2.

Alternatively, applicator 18 may apply the wetting agent in small drop weights compared to the drop weights of the binder. This allows applicator 18 to either maintain its distance from powder layer 6 during the application of both the wetting agent and the binder or decrease the distance during the application of the binder.

After the binder is applied 24, a determination is made 40 whether fabrication is complete for the three-dimensional object 4. If not, the steps may be repeated until the three-dimensional object 4 is fabricated.

The techniques of the present invention reduce the problems created by easily disturbed particles by temporarily holding them in place using a wetting agent. Pre-wetting the powder reduces the "cratering" caused by the collision of the binder drops with the surface of the powder. Capillary forces enabled by the wetting agent keep particles together and hinder their movement on binder drop impact. Consequently, printed object surface smoothness and overall object quality is improved.

Pre-wetting the powder also reduces the effects of turbulence created by the high-speed motion of the applicator used to apply the binder. Pre-wetting allows applicator motion to be much closer to the surface of the powder, with less risk of contamination to print members, than if pre-wetting was not performed. For example, powder-based three dimensional object fabricators utilizing ink jet printheads, such as machines sold by Z-Corp, typically maintain a separation distance of about 6 mm or more. Whereas, with other applications of ink jet printheads where powder-disturbance considerations are not present, a separation distance of about 1.3 mm is possible. Reduced spacing provides better accuracy in placing binder fluids and, therefore, results in better object dimensional accuracy and appearance. The object appearance may be improved by reducing cratering and, where color is applied during the build process, improving the coloration consistency with accurate and reliable drop placement.

Additionally, for objects where color is applied, poor appearance may result from even a small number of blocked nozzles on one print member.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for fabricating a three-dimensional object, the method comprising:
   depositing a powder layer;
   selectively wetting the powder layer with a wetting agent that does not permanently bind the powder to hinder movement of the powder;
   applying a binder to selected areas of the powder layer to harden the selected areas of the powder layer; and
   repeating the steps until the three-dimensional object is fabricated.

2. The method of claim 1 wherein selectively wetting the powder layer includes wetting all of the powder layer except the edges of the powder layer.

3. The method of claim 1 wherein selectively wetting the powder layer includes wetting the powder layer in a checkerboard pattern.

4. The method of claim 1 wherein wetting the powder layer includes wetting the powder layer with a hydrophobic liquid.

5. The method of claim 4 wherein the hydrophobic liquid includes a silicone fluid.

6. The method of claim 1 wherein wetting the powder layer includes wetting the powder layer with the binder at a saturation level below the saturation level required for binding the powder layer.

7. The method of claim 1 wherein wetting the powder layer includes wetting the powder layer by aerosol spraying.

8. The method of claim 1 wherein wetting the powder layer includes wetting the powder layer with a printhead device.

9. The method of claim 1 wherein wetting the powder layer includes wetting the powder layer from a distance greater than the distance from which the binder is applied to the powder layer.

10. A solid freeform fabrication tool for making a three-dimensional object from powder layers, the tool comprising:
    a work surface to support the object while being fabricated;
    a powder distributor configured to deposit powder layers onto the work surface;
    a dispenser configured to dispense wetting agent onto the powder layers; and
    an applicator configured to apply binder to selected areas of the powder layers;
    wherein said dispenser is configured to deliver said wetting agent to said powder layers with a lower kinetic energy than said binder is delivered by said applicator.

11. The tool of claim 10 wherein the dispenser includes an aerosol spray head.

12. The tool of claim 10 wherein the dispenser includes a printhead device.

13. The tool of claim 10 wherein the dispenser is a distance greater from the work surface than the applicator is from the work surface.

14. A solid freeform fabrication tool for making a three-dimensional object from powder layers, the tool comprising:
    a work surface to support the object while being fabricated;
    a powder distributor configured to deposit powder layers onto the work surface; and
    an applicator configured to sequentially dispense a wetting agent onto the powder layers that does not permanently bind said powder layers and then to apply binder to selected areas of the powder layers.

15. The tool of claim 14 wherein the applicator includes an aerosol spray head.

16. The tool of claim 14 wherein the applicator includes a printhead device.

17. A solid freeform fabrication tool for making a three-dimensional object from powder layers, the tool comprising:
    means for supporting the object while being fabricated;
    means for depositing powder layers onto the means for supporting;
    means for dispensing wetting agent onto the powder layers, wherein said wetting agent does not permanently bind powder of a powder layer; and
    means for applying binder to selected areas of the powder layers.

18. The tool of claim 17 wherein the means for dispensing includes an aerosol spray head.

19. The tool of claim 17 wherein the means for dispensing includes a printhead device.

20. The tool of claim 17 wherein the means for dispensing is a distance greater from the work surface than the applicator.

21. A solid freeform fabrication tool for making a three-dimensional object from powder layers, the tool comprising:
    means for supporting the object while being fabricated;
    means for depositing powder layers onto the means for supporting; and
    means for sequentially dispensing a wetting agent onto the powder layers and then applying binder to selected areas of the powder layers;
    wherein said wetting agent is delivered to said powder layers with a lower kinetic energy than said binder is delivered.

22. The tool of claim 21 wherein the means for dispensing and applying includes an aerosol spray head.

23. The tool of claim 21 wherein means for dispensing and applying includes a printhead device.

24. The method of claim 1 wherein wetting the powder layer includes wetting the powder layer with a wetting agent comprising an alcohol.

25. The method of claim 1 wherein wetting the powder layer comprises wetting the powder layer only where said binder is not applied.

26. A method for fabricating a three-dimensional object, the method comprising:
    depositing a powder layer;
    selectively wetting the powder layer with a wetting agent that does not permanently bind the powder to hinder movement of the powder;
    applying a binder to selected areas of the powder layer to harden the selected areas of the powder layer; and
    repeating the steps until the three-dimensional object is fabricated;
    wherein wetting the powder layer comprises applying a drop a wetting fluid per voxel of said powder layer.

* * * * *